3,266,940
FUEL CELL CONTAINING SOLID ALUMINO-
SILICATE ELECTROLYTE
Philip D. Caesar, Wenonah, N.J., assignor to Socony
Mobil Oil Company, Inc., a corporation of New
York
Filed Apr. 20, 1962, Ser. No. 189,118
2 Claims. (Cl. 136—86)

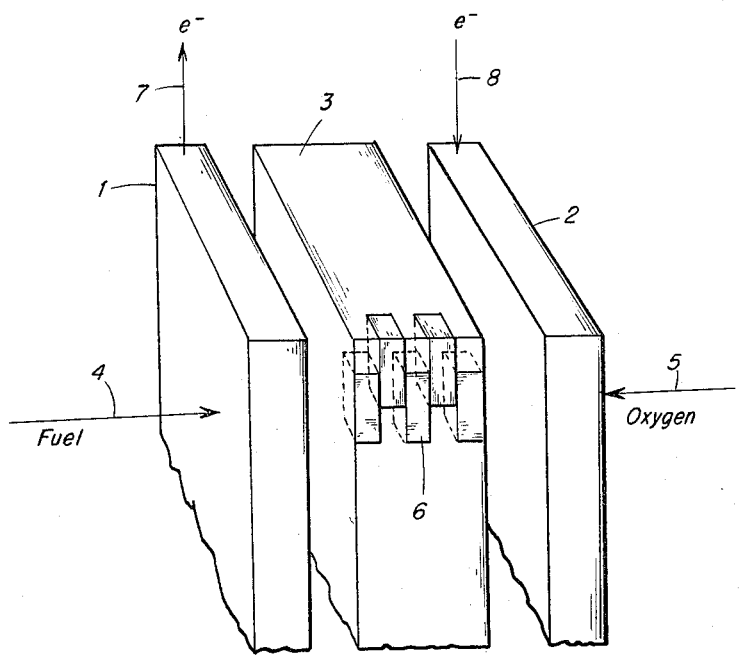

This invention has to do with fuel cells and is particularly concerned with a type of fuel cell operable at low temperatures and producing power from the electrochemical reactions of fuels such as hydrogen, hydrocarbons, and the like.

A fuel cell is usually composed of a pair of electrodes, which may themselves be catalytic to the desired reactions, or which may have catalytic material deposited in, upon, or adjacent their electrolyte-facing surfaces, which electrodes are separated by an ion-conductive electrolyte. Provisions are made for a supply of fuel to one electrode, and for a supply of fuel converting agent to the other electrode. A usual manner of supply of fuel and converting agent is by passing them through a porous electrode into the conversion area adjacent the contact of electrode and electrolyte. Other systems are also used. A very simple typical arrangement is that of two porous carbon cylindrical electrodes, each carrying a catalyst such as platinum, or other metal, separated by an aqueous acidic electrolyte, with a supply of hydrogen to the interior of one electrode and of oxygen to the other.

This invention has for its object the provision of a cell structure utilizing materials, novel in this environment, which are capable of acting both as catalysts for the cell reactions and as the electrolyte component of the cell structure.

The single figure of drawing attached hereto shows, in schematic form, a cell utilizing this material.

The novel materials for fuel cell construction with which this invention is concerned are certain zeolitic or ion-exchanging materials of crystalline aluminosilicate nature.

Such materials, both naturally occurring and synthesized, have rather definite proportional relations of aluminum and silicon and an ordered internal structure resulting in high porosity and pores of well defined size. They have been termed "molecular sieves" because of their ability to accept for absorption, etc., molecules of definite size or configuration while rejecting molecules larger in size or of a configuration not permitting entry into the pores. Because of their ordered material structure, they are usually spoken of as crystalline.

Such materials may be generally expressed by a formula such as:

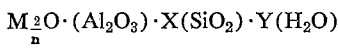
$$M_{\frac{2}{n}}O \cdot (Al_2O_3) \cdot X(SiO_2) \cdot Y(H_2O)$$

which expresses the metal "salt" form of the zeolite, in hydrated form. (M is a cation and $n$ is the valence of M.)

Such materials are capable of base-exchange, or more broadly, of cation exchange. For example, many materials of this class may be base-exchanged with a material such as an ammonium salt, to replace a desired portion, or all, of the metal cation of ammonium cation. Following this by heating to drive off ammonium leaves an acid or so-called "H" form of the zeolite material. Other methods may be used, such as leaching with acid, to replace metal cations with hydrogen to arrive at the acid form.

These materials, particularly in their "H" form are catalytic to the oxidation and reduction reactions of a fuel cell. They are also ion-conductive.

Consequently a fuel cell may be constructed as in the single figure of the drawing, consisting of a fuel-supplied, electron-conductive electrode, a partition member consisting substantially of a selected zeolitic material, and a second electron-conductive electrode supplied with a conversion reagent.

In the drawing, which is highly schematic, 1 and 2 are electrodes, and 3 is an electrolyte-catalyst, described more in detail hereinafter, with fuel supplied at 4 and oxygen or air at 5, the ordered internal structure of the electrolyte is indicated at 6, with electrons flowing from electrode 1 through conductor 7 and flowing to electrode 2 through conductor 8.

Certain elements of the cell shown are familiar. The electrodes, for example, may be any electron-conductive material, such as porous carbon, porous metals arrived at by various techniques such as, for example, powder metallurgical methods followed by leaching, or mesh form bodies of metal or other electron-conductive material. The supply of fuel and oxidant behind the porous electrodes to flow therethrough is also familiar. It is to be noted that the electrodes are to be substantially in contact with the electrolyte, rather than as separated, for increased clarity, in the schematic drawing.

The specific novelty herein resides in the electrolyte-catalyst, typified in the drawings by item 3.

This electrolyte-catalyst material is a zeolite, or crystalline aluminosilicate of ordered internal structure, capable of base-exchange, which may preferably be used in the acid form, or in a partially base-exchanged form.

The electrolyte "membrane" may be formed in several ways. The aluminosilicate material may be ground quite fine, or its preparation may be so conducted to give, in either case, particles having dimensions of the order of 1 micron or less. These materials, in aqueous suspension, may be "painted" upon a support; they may be suspended in the presence of an organic coherence agent, such as a starch or gum, which may be calcined out, if desired; suspensions in volatile solvents may be used; the fine material may be sucked in or deposited in a support such as, for example, a cellulosic sheet of controlled porosity, which later may be calcined out if desired; they may be sucked into, deposited in, or actually created in the openings and passages of a supporting matrix, such as, for example, a resinous matrix. The support, if used, may be inert or may be ion-conductive, although such ion-conductivity in the support or matrix is not a necessary feature.

The electrolyte membrane should have a thickness of from about 1 micron to about 1000 microns, with preference being had for thicknesses in the range of 5 to 100 microns.

Since these materials, particularly in the acid or H-form are catalytic to the fuel cell reactions, an interesting manner of preparation of my novel fuel cell assembly presents itself.

A fuel cell electrode may be provided as described in my co-pending application Serial Number 183,711, filed March 30, 1962, now abandoned, by furnishing an electron-conductive support, coated with aluminosilicate material. The electron-conductive support may be any suitable porous material, such as porous carbon, electrodes of porous metals or metal combinations arrived at by various known means, metallic gauzes, and the like. The aluminosilicate material may be deposited therein or thereon by any of the means discussed above. Two particularly effective means are by sucking the aluminosilicate into the pores from a suspension, or forming the material within the pores by introducing the forming reactants thereinto.

Electrodes so formed, with either one of them or both together carrying a sufficiently thick superficial deposit of aluminosilicate to act as an electrode-separating electrolyte may be placed together to form the cell of this disclosure.

It is, of course, contemplated that substances catalytic to the fuel cell reaction may be associated with the catalytic layer of aluminosilicate. Such materials should, in general, be absent from the electrolytic layer of the assembly.

As an example of electrolyte-catalyst material, H-mordenite, that is, the hydrogen or acid form of the zeolite mordenite may be used.

Mordenite, which occurs naturally and also has been synthesized, in the "salt" form, corresponds to the formula:

$$Na_8(AlO_2)_8(SiO_2)_{40}24H_2O$$

It has an Al/Si ratio of 1/5 and crystallizes in chains of 5-membered rings of tetrahedra, its porosity indicating one system of parallel channels having free diameters of the order of 4 A. to 6.6 A., interconnected by smaller channels, parallel to another axis of the order of 2.8 A. free diameter.

The H-form of mordenite may be prepared by leaching with hydrochloric acid, rinsing and drying, in known manner. Such treatment may be so conducted as to remove desired amounts of the metal cation, leaving the H or acid form. Desirably, about at least 50% (wt.) of the material should be in the acid form.

Such H mordenite is not only ion-conductive, but also catalytic to hydrocarbon reactions of various kinds. It lends itself admirably to the dual function outlined above.

For example, it is catalytic, at temperatures less than 200° C.:

(a) To the cathode reaction $$3O_2 + 12e^- + 12H^+ \rightarrow 6H_2O$$

(b) To the anode reaction, for example $$C_2H_4 + 4H_2O \rightarrow 12H^+ + 12e^- + 2CO_2$$

If the H-form crystalline aluminosilicate be used, it is necessary to utilize an aluminosilicate which is physically stable in the H-form. The ratio of aluminum atoms to silicon atoms in these materials is ordinarily found to range from about 1/1 to upwards of 1/7. In general, those with a high silica content are physically stable in the H-form, while some of those at the lower end of the range are not so stable. A hard and fast relationship between silica content and H-form stability cannot be stated, not only because this stability is in part dependent upon how extensive the conversion to H-form has been, but also in some cases a relatively unstable H-form may be made more stable by so handling the preparation that some of the remaining metal cations are alkaline earth metals. In general, this feature of the materials is defined herein as having a sufficient silica content to be physically stable in the acid or H-form.

These aluminosilicate materials are generally of crystalline nature as shown in examinations such as by X-ray diffraction examination of powder. Whether this be rigorously true or not, they are certainly possessed of ordered internal structure, and the word "crystalline" is herein used in such sense.

Referring to the cell, itself, while these aluminosilicate materials are ion-conductive in the dry state, it is necessary, for high ion-conductivity of the aluminosilicate electrolyte component, that what amounts to an aqueous system be maintained therein. This may be done by keeping the electrolyte moist by any of several means. It may be installed dry or as a paste, and moistened or kept moistened by providing a controlled amount of moisture to enter with the fuel—as, for example, hydrogen with controlled water vapor content. Alternately, it may be kept moist by drip of moisture into the electrolyte component, or by equivalent moisture addition. As moistening agent, an aqueous solution of any of the acidic or basic materials or neutral salts known to the art for use in aqueous fuel cells, electrolytes may be used, although the use of such materials will not usually be necessary, water alone being preferable, and being advantageous because of lack of corrosive action, simplicity, and the like.

In summation, this invention provides a fuel cell construction of two porous electrodes separated by a catalyst-electrolyte material consisting substantially of an aluminosilicate material of ordered internal structure and of sufficiently high silica content to be physically stable in the acid or H form. In its preferred form, the aluminosilicate catalyst-electrolyte material as provided initially is substantially in the acid form. Additionally, the provision of enhanced catalytic activity adjacent the electrodes is contemplated, as well as means for maintaining a high ion-conductivity of the electrolyte component.

I claim:

1. In a fuel cell comprising a pair of spaced-apart, porous, electron-conductive electrodes and an electrolyte therebetween in contact with each electrode so as to form an interface therewith, means for supplying a fuel to one electrode on the side remote from the electrolyte, and means for supplying a fuel converting agent to the other electrode on the side remote from the electrolyte, the improvement wherein said electrolyte is the sole electrolyte and comprises a solid layer of a moistened, ion-conductive, porous crystalline aluminosilicate, said aluminosilicate being a molecular sieve and having an internal system of interconnecting channels, said aluminosilicate being at least partly in the acid form and having a sufficient silica content as to be physically stable in said acid form, said layer being formed of discrete aluminosilicate particles, the thickness of said layer being in the range of about 1 to 1000 microns, said layer thickness being great enough to prevent electron transfer but thin enough to provide effective ion transfer therethrough, said layer preventing physical contact between said electrodes, and said layer at each said interface with an electrode having catalytic activity for the fuel cell reaction occurring at said interface.

2. The fuel cell of claim 1 wherein the thickness of said layer is in the range of 1 to 100 microns.

References Cited by the Examiner

UNITED STATES PATENTS

| | | | |
|---|---|---|---|
| 2,574,895 | 11/1951 | Stecker | 252—450 |
| 2,848,346 | 8/1958 | Bertorelli | 106—306 |
| 2,901,524 | 8/1959 | Gorin et al. | 136—86 |
| 2,913,511 | 11/1959 | Grubb | 136—86 |
| 3,097,116 | 7/1963 | Moos | 136—86 X |
| 3,147,149 | 9/1964 | Postal | 136—86 |

WINSTON A. DOUGLAS, *Primary Examiner.*

JOHN R. SPECK, *Examiner.*

H. FEELEY, A. B. CURTIS, *Assistant Examiners.*